Jan. 23, 1968          P. J. YAVORSKY         3,365,317
ZIRCONIA-MAGNESIA COMPOSITION AND METHOD OF MAKING
AND USING THE SAME
Original Filed Nov. 14, 1963

INVENTOR.
PAUL J. YAVORSKY
BY
Baldwin, Doran & Egan
ATTORNEYS

United States Patent Office 3,365,317
Patented Jan. 23, 1968

3,365,317
ZIRCONIA-MAGNESIA COMPOSITION AND METHOD OF MAKING AND USING THE SAME
Paul J. Yavorsky, Bedford, Ohio, assignor to Zirconium Corporation of America, Solon, Ohio, a corporation of Ohio
Continuation of application Ser. No. 323,643, Nov. 14, 1963. This application Apr. 12, 1967, Ser. No. 629,123
6 Claims. (Cl. 106—57)

The present invention relates to an extrusion die of an erosion resistant, corrosion resistant, refractory zirconia composition having a certain amount of magnesium oxide therein.

This application is a continuation of Ser. No. 323,643, filed Nov. 14, 1963.

The present invention also relates to the zirconium oxide ceramic composition itself, the composition having a novel combination of lubricity, toughness, abrasion resistance and chemical inertness which combination of properties is retained even at high temperatures to permit its use in an extrusion die in which very high temperatures are involved.

It is an object of the present invention to provide a corrosion resistant, erosion resistant, refractory article that can be used as an extrusion die at temperatures as high as 4300° F. without deterioration thereof whereby high quality steel pipe and the like can be extruded in large quantities.

It is an object of the present invention to provide an erosion resistant refractory article of zirconium oxide containing therein about 2.8 to 3.5% by weight of magnesium oxide, the refractory article having an unusual combination of lubricity, toughness, and inertness to thereby provide an excellent drawing die material, the above physical properties being retained to a large extent even at high temperatures in the order of 3000° to 4300° F. to thereby provide an outstanding extrusion die material.

It is an object of the present invention to provide an extrusion or drawing die of a corrosion resistant refractory ceramic composition comprising zirconia and about 2.8 to 3.5% by weight of the zirconia of magnesium oxide, and a metal holder for said ceramic die to give the die strength and body.

Other objects will be apparent from the specification that follows, the appended claims and the drawings in which:

Figure 1:
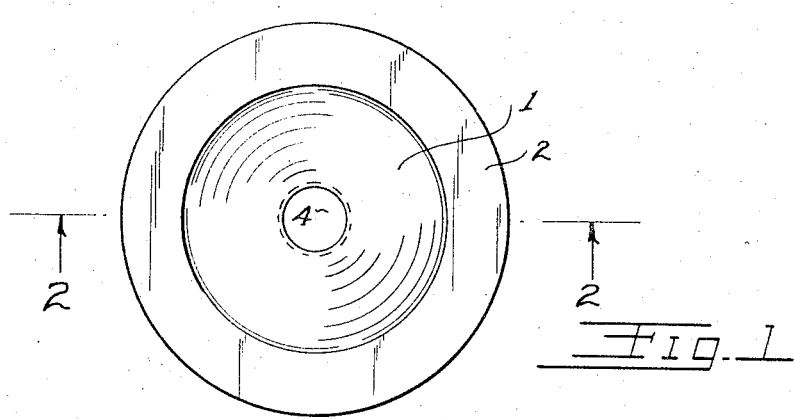
FIG. 1 is a top plan view of an extrusion die of a refractory ceramic material made in accordance with the present invention and a metal holder therefor.

The present invention provides an extrusion die 1 of a ceramic material that has great lubricity and corrosion resistance at high temperatures and a metal holder 2 for said die to strengthen the same. The die 1 has an inner central side wall portion 3 that defines a generally circular cross sectional opening 4 and an inclined inner side wall portion 6 that defines a frusto-conical opening 7 immediately above the circular opening 4. The above described inner side wall portions 3 and 6 have great lubricity and abrasion resistance at the temperature encountered in metal extrusion operations whereby high quality steel pipe, rods, wire or the like can be extruded economically at a high production rate.

Generally, ceramic materials have been considered too brittle and not rugged enough for the severe impact and erosive conditions encountered in metal extrusion die applications. However, the zirconia-magnesia composition of the present invention has been developed to produce an outstanding die material for drawing or extrusion.

Figure 3:
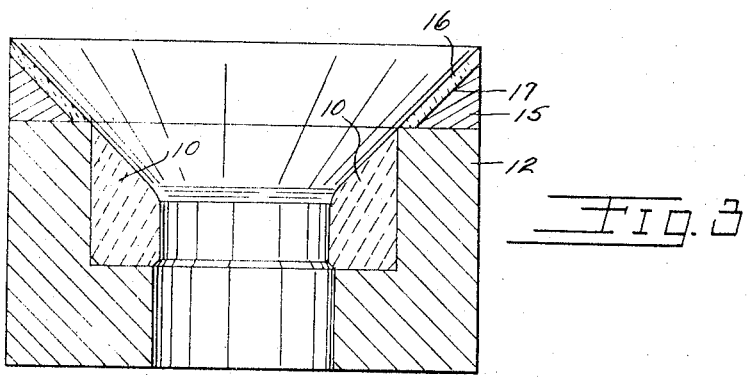
FIG. 3 is a sectional view of another embodiment of a ceramic extrusion die and a metal holder therefor.

In FIG. 3, an alternate embodiment of a die and holder assembly is shown. A die 10 of a material and a shape similar to that of die 1 of FIG. 1 is provided and encased within a metal holder 12 that is substantially the same as holder 2 of FIG. 1. An annular upper metal holder section 15 of generally a circular outline is provided at the top of the holder 12. An inner facing material 16 is provided on the inner slanted side wall 17 of the holder section 15 to aid in the extrusion of tungsten rods or other high melting metal rods. The facing material is generally thinner in section than the zirconia-magnesia composition of die 10, and the facing 16 is made of refractory zirconia composition containing magnesia, or other stabilizers and generally applied by flame spraying. The formulation used to make the die 10 can be used to make the facing 16, or other $ZrO_2$ compositions may be effectively employed.

Using an extrusion die of a zirconia composition comprising zirconia and 3.0% by weight thereof of magnesium oxide, 750 feet of 5/16 inch diameter steel rod has been extruded, the resultant rod being free of severe surface blemishes, of excellent surface finish and within adequate diameter tolerances. In another performance, 630 feet of 3/4 inch stainless steel pipe was extruded, the resultant surface being free of any severe damage and the size tolerances being kept to a minimum. In still another run, 1680 feet of 3/4 inch stainless steel pipe has been extruded satisfactorily through the above described zirconia-magnesia refractory die.

In still another application involving a metal other than steel, high quality tungsten rod of 1/2 inch diameter was extruded in a quantity and quality not previously produced, the extrusion die material remaining corrosion and erosion resistant even at the high temperatures encountered in extruding the tungsten rod. In another instance, 1100 feet of copper alloy tube was drawn at greater than 40% reduction to smooth walled finished tubing.

Such accomplishments apparently are the result of the unusual combination of the great lubricity, toughness, abrasion resistance and chemical inertness of the zirconia-magnesia composition even at the high pressures encountered in the drawing operations and the high pressure-temperatrue experienced in extrusion. This novel combination of properties apparently is at least partially a result of high monoclinic and tetragonal zirconia phases developed in the zirconia-magnesia binary porcelain by the precise preparation and firing processes hereinafter described in more detail. Some of the lubricity and abrasion resistance at high temperatures may be the result of the behavior of the above described composition on reheating during service above 1500° F.—through which temperature zone cubic zirconia begins to revert to monoclinic zirconia and subsequently to tetragonal zirconia on cooling. Repeating cycling from room temperature to the higher temperatures above mentioned apparently continues to reduce the cubic phase content. The following examples illustrate the preparation of the zirconia-magnesia refractory composition and dies made therefrom:

*Example 1*

Particles of zirconium oxide having a purity of 99.2% and having an average particle size of ten microns are blended with milled fused magnesium oxide of a similar particle size. Organic binders, namely dextrin and methocel, are added and also milled with the zirconium oxide and magnesium oxide. A preservative, in the form of a 20% aqueous solution of Dowicide G, a water-soluble phenolic compound sold by the Dow Chemical Company, is also added in accordance with the formulation below.

Ingredients: Parts by wt.
Zirconium oxide, less than 325 mesh _____ 97
Fused magnesium oxide, less than 325 mesh ____ 3
Dextrin _____ 1
Methocel _____ 1
Water _____ 8
Dowicide G (20% solution) _____ 1

The granules formed by mulling the above ingredients are comminuted to 28 mesh, the moisture therein adjusted by partial drying to a moisture content of about 4% by weight and the granules pressed in a steel die at 8000 p.s.i. forming pressure. The formed article is dried and fired at 3250° F. The resultant fired ceramic article, which is shaped in the form of a circular, cylindrical die such as die 1 in FIG. 1, is fine grained—being less than 100 microns in crystallite size. The resultant fired article is also impervious to moisture and dye penetration at 1000 p.s.i.

The above described impervious die was encased in a steel holder such as holder 2 of FIG. 1 to form a prestressed die and the combination of die and holder used to extrude 860 feet of a $5/16$ inch diameter steel rod. The resultant extruded rod was free from serious surface defects and the diameter was kept at $5/16$ inch $\pm 1/64$ inch throughout the run.

Especially good results have been obtained with prestressed drawing and extrusion dies. When the ceramic material is confined in a shrink-fit die, apparent the strength thereof increases due to the compressive loading on the material to provide the prestressed condition. The diameter of the die apparently decreases up to about $1/1000$ inch per inch at the maximum shrinkage obtained.

The resultant extrusion die material of Example 1 has approximately the following physical properties and electrical properties.

Properties: Values
Density _____ 5.5 g./cc.
Compressive strength _____ Minimum of 250,000 p.s.i.
Modulus of elasticity _____ $22 \times 10^6$ p.s.i.
Thermal conductivity ____ .005 cal./sec./cm./ cm.$^2$/° C.
Coefficient of expansion room temperature to about 1400° C. _____ $7.3 \times 10^{-6}$ cm./cm./° C.
Volume resistivity _____ $10^8$ ohm-cm. at 20° C.
Dissipation factor _____ .003 at 1 mc.
Dielectric constant _____ 27 at 1 mc.

Figure 2:
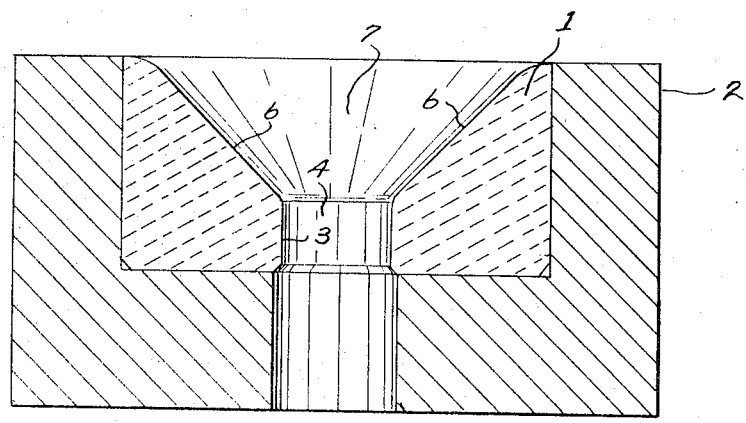
FIG. 2 is a cross sectional view of the extrusion die and holder of FIG. 1 taken along the line indicated at 2—2 in FIG. 1.

The above described ceramic die material is well adapted for use as a drawing die, such as the die of FIGS. 1–2, for metals such as copper alloys. It has been found that a drawing die of the above material is surprisingly tough, inert and has excellent lubricity, such a die being greatly superior to steel or tungsten carbide dies for drawing to very close tolerances, such as $2/10,000$ of an inch, over a long run.

*Example 2*

According to the procedure outlined in Example 1, the following formulation was mixed, dried and fired to produce a refractory zirconia-magnesia extrusion die.

Ingredients: Parts by wt.
Zirconium oxide, less than 325 mesh _____ 97
Magnesium fluoride, less than 325 mesh _____ 4.6
Dextrin _____ 2
Water _____ 10
Dowicide G (20% solution) _____ 1

The above formulation was formed as a porcelain die shaped like die 1 of FIG. 1, and fired at 3000° F. to provide an impervious abrasion resistant material having lubricity. A tungsten rod was extruded using this die, the resultant rod having a diameter of ½ inch and being free of major surface defects. The diameter was kept within a tolerance of $2/1000$ of an inch in a run of 100 feet.

*Example 3*

Another refractory abrasion resistant, corrosion resistant and erosion resistant extrusion die was made by mixing, drying, forming, and firing the following formulation.

Ingredients: Parts by wt.
Zirconium oxide, less than 325 mesh _____ 100
Magnesium carbonate, less than 325 mesh ____ 6.3
Dextrin _____ 1
Methocel _____ 1
Water _____ 10
Dowicide G (20% solution) _____ 1

The above green die was fired at 2750° F. to provide an imprevious, erosion resistant die material.

*Example 4*

The formulation below was used to prepare a refractory zirconia-magnesia extrusion die generally using the methods described in Example 1.

Ingredients: Parts by wt.
Zirconium oxide _____ 100
Fused magnesia _____ 3
Dextrin _____ 1
Polyvinyl alcohol _____ 2
Wax _____ 1
Water _____ 14
Dowicide G (20% solution) _____ 1

The above composition was mixed and partially dried as described in Example 1. Thereafter the composition was pressed and fired at 3250° F. to form a hard tough corrosion resistant extrusion die.

It has been found in order to obtain the unusually long lasting extrusion die material of the present invention, a range of about 2.8 to 3.5 parts of magnesium oxide must be used. For instance, 2.2 parts of magnesium oxide is not enough magnesium oxide to adequately stabilize the zirconia and there is a decided loss of impervious and stabilizing qualities. The resultant material, made with 2.2 percent by weight of magnesium oxide, is not suitable for commercial operations as an extrusion die material. For instance, a $5/16$ inch diameter steel rod has severe surface blemishes when extruded through a die made of such a composition and the quality and quantity of the steel rod was not good enough for most commercial applications.

It has also been found that when greater than 3.5% by weight of magnesium oxide is used, say 4%, the material starts to lose its highest impact strength and the abrasion resistance is not as satisfactory for an outstanding extrusion or drawing die material.

The extrusion die material of high monoclinic and tetragonal zirconium phase content can generally be made by mixing about 96.5 parts to about 97.2 parts by weight of finely divided zirconia with about 2.8 to 3.5 parts by weight of finely divided magnesium oxide or a finely divided salt of magnesium that converts to the above 2.8 to 3.5 parts by weight of MgO during heating, compacting the resultant mixture and firing the compacted mixture at about 2500° F. to 3500° F. or slightly more and thereafter slowing cooling the fired article at a rate of about 100° F. to 200° F. per hour to maximize the amount of monoclinic zirconium and tetragonal zirconia phase contents.

*Example 5*

A series of zirconia-magnesia compositions were prepared using from 1 to 6% by weight of magnesia. The basic formulation to prepare test samples was similar to that of Example 1 except, of course, various amounts of magnesia were used. Each of the compositions were formed by pressing at 5000 p.s.i. and firing at 2950° F.

or 3250° F. and thereafter tested as hereinafter explained in more detail.

A series of ZrO$_2$-MgO compositions that were pressed at 5000 p.s.i. and fired at 3250° F. were tested and their modulus of rupture determined as follows.

| Composition (percent by weight of MgO): | Modulus of rupture (p.s.i.) |
|---|---|
| 1 | 2,000 |
| 2 | 15,000 |
| 2.5 | 22,000 |
| 3.0 | 30,000 |
| 3.5 | 28,000 |
| 4 | 26,000 |
| 5 | 22,000 |

As noted in the above table, about 2.8 to 3.5% by weight of magnesia is necessary to get a desired modulus of rupture of at least about 27,000 p.s.i.

*Example 6*

In another series of tests in which refractory zirconia magnesia compositions were prepared as described in Example 5, the porosity of the ZrO$_2$-MgO compositions were estimated visually by observing the extent of fuchsine dye penetration after one hour soaking at no pressure on the dye. Each sample was thereafter fractured and the observation recorded as follows:

| Percent MgO | 2,950° F. Burn | 3,250° F. Burn |
|---|---|---|
| 1 | Very porous | Very porous. |
| 1½ | ----do---- | Do. |
| 2 | ----do---- | Do. |
| 2½ | Stony—slightly porous | Stony—very slightly porous. |
| 3 | Stony—very slightly porous | Stony—impervious. |
| 3½ | Stony—impervious | Intermediate—impervious. |
| 4 | Intermediate—impervious | Do. |
| 4½ | Glassy—impervious | Glassy—impervious. |
| 5 | ----do---- | Do. |
| 5½ | ----do---- | Do. |
| 6 | ----do---- | Do. |

As indicated by the above table, observation of the fracture gives one a visual estimate of the crystallite type. A stony fracture generally is rough and somewhat matte, the fracture proceeding predominantly around the crystals at their boundaries. A glassy fracture is more conchoidal than a stony fracture. The surface of a glassy fracture is glossy and the rupture is predominantly through the crystals. The stony porcelains are more impact resistant than glassy porcelains of equal imperviousness.

As indicated in the above table, about 2.8 to 3.5% by weight of MgO provides fired ceramic compositions with the best balance of impact resistance and imperviousness.

*Example 7*

A series of test samples were made as described in Example 5, the samples being pressed at 5000 p.s.i. and fired at 3250° F. The duration of visual glow was recorded for each of the compositions, the compositions being exposed for 15 seconds to a 2537 A. blue light and the residual fluorescence (phosphorescence) of each of the compositions of the fired ceramic compositions was measured. The results are reported below.

| Percent MgO: | Duration of glow (seconds) |
|---|---|
| 1.0 | 28 |
| 1.5 | 26 |
| 2.0 | 24 |
| 2.5 | 21 |
| 3.0 | 6 |
| 3.5 | 6 |
| 4.0 | 5 |
| 4.5 | 5 |
| 5.0 | 4 |
| 5.5 | 4 |
| 6.0 | 4 |

As noted in the above examples, although magnesium oxide is by far the best material for producing the outstanding extrusion die, salts of magnesium such as magnesium carbonate and magnesium fluoride that convert to magnesium oxide upon heating can be used in place of all or part of the magnesium oxide.

I claim:
1. A fired refractory composition comprising about 96.5 to 97.2 percent by weight of zirconia and about 2.8 to 3.5 percent by weight of magnesia, the fired composition being impervious, characterized as a stony porcelain with its fracture characteristic being predominantly along the crystal boundary, having a low thermal expansion that is not greater than $7.3 \times 10^{-6}$ cm./cm./° C. from room temperature to 1400° C., a compressive strength of at least 250,000 p.s.i., and a modulus of rupture of at least about 27,000 p.s.i.

2. A refractory composition as defined in claim 1 and wherein the crystal structure of the zirconia has at least two phases one of which is tetragonal and the other being selectively either cubic and monoclinic.

3. A refractory composition as defined in claim 1 in which the percent of zirconia is about 97 and the percent of magnesia is about 3.

4. A refractory composition as defined in claim 1 in which the percent of zirconia is about 97 and the percent of magnesia is about 3, the composition being formed at about 8000 p.s.i. and fired at about 3250° F.

5. A refractory composition as defined in claim 1 in which the composition is fired at about 2500° F. to 3500° F.

6. A refractory composition as defined in claim 5 in which the composition is fired at about 3250° F.

References Cited

UNITED STATES PATENTS

| 2,567,592 | 9/1951 | Ballard | 106—57 |
| 2,602,708 | 7/1952 | Wheildon | 106—57 |
| 2,937,102 | 5/1960 | Wagner | 106—57 |

TOBIAS E. LEVOW, *Primary Examiner.*

JAMES E. POER, *Examiner.*